United States Patent [19]

Gillé et al.

[11] Patent Number: 4,885,512
[45] Date of Patent: Dec. 5, 1989

[54] WIPER CIRCUIT SYSTEM FOR MOTOR VEHICLES

[75] Inventors: Günther Gillé, Sersheim; Horst Goertler, Sachsenheim, both of Fed. Rep. of Germany

[73] Assignee: SWF Auto-Electric GmbH, Bietigheim-Bissingen, Fed. Rep. of Germany

[21] Appl. No.: 249,923

[22] PCT Filed: Nov. 24, 1987

[86] PCT No.: PCT/EP87/00725
§ 371 Date: Aug. 18, 1988
§ 102(e) Date: Aug. 18, 1988

[87] PCT Pub. No.: WO88/04623
PCT Pub. Date: Jun. 30, 1988

[30] Foreign Application Priority Data

Dec. 19, 1986 [DE] Fed. Rep. of Germany ....... 3643414

[51] Int. Cl.⁴ .................................................. B60S 1/08
[52] U.S. Cl. ............................... 318/444; 318/DIG. 2
[58] Field of Search .......... 318/434, 443, 444, DIG. 2; 15/250 C, 250.13, 250.16, 250.17

[56] References Cited

U.S. PATENT DOCUMENTS

| | | | |
|---|---|---|---|
| 4,314,186 | 2/1982 | Gille et al. | 318/DIG. 2 X |
| 4,320,329 | 3/1982 | Gille et al. | 318/306 X |
| 4,388,574 | 6/1983 | Bois et al. | 318/443 |
| 4,567,412 | 1/1986 | Graham | 318/DIG. 2 X |
| 4,620,141 | 10/1986 | McCumber et al. | 318/483 |
| 4,689,535 | 8/1987 | Tsunoda et al. | 15/250.17 X |

Primary Examiner—Bentsu Ro
Attorney, Agent, or Firm—Robert P. Seitter

[57] ABSTRACT

A wiper system for motor vehicles. The wiper system has a switching circuit which derives from a timing signal, time-dependent switching and controlling signals provided by an oscillator that determines for example the duration of the intervals in an intermittent mode of operation or the reference time span for implementing anti-blocking protection of the wiper motor. The timing frequency of this oscillator is kept constant during the intervals in the intermittent mode of operation, otherwise it varies depending on the battery voltage when the wiper motor is operating. The intervals are thus maintained with precision, whereas the reference time span is adapted to the wiping time that changes as a function of the battery voltage when the motor is operating, thus ensuring optimal anti-blocking protection.

4 Claims, 1 Drawing Sheet

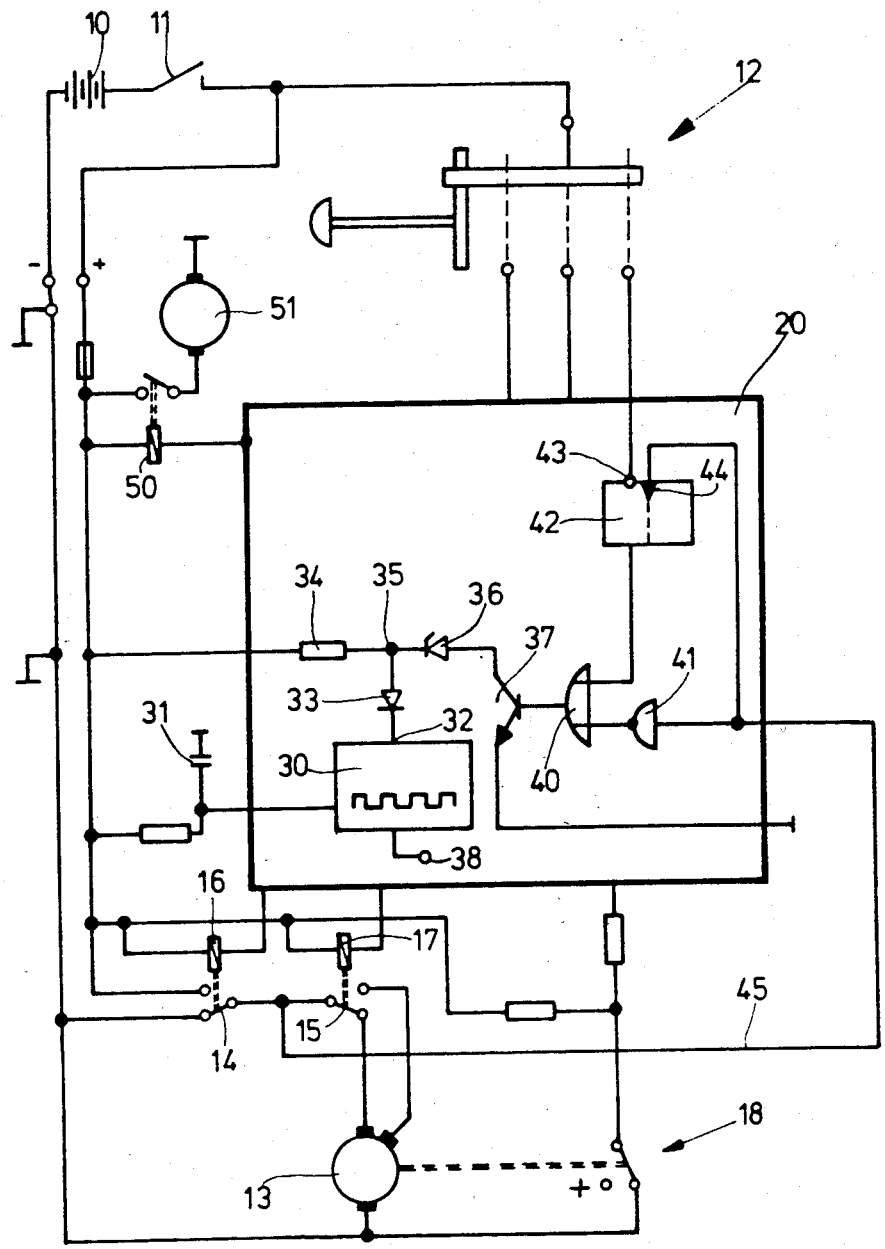

WIPER CIRCUIT SYSTEM FOR MOTOR VEHICLES

BACKGROUND OF THE INVENTION

This invention relates to wiper systems of modern motor vehicles in which different modes of operation can be chosen via an operating switch, as for instance continuous operation, intermittent operation, wipe-wash-operation. For implementing these different modes of operation a control device with a circuit is needed, which circuit releases time-dependent switching and/or controlling signals. A time-dependent switching signal, for example, determines the interval of the intermittent operation, another time-dependent switching signal could determine the wipe-after-wash period during the wipe-wash operation. In general, the time taken by such a switching signal is to be as constant as possible and does not depend on any conditions of environment.

Wiper systems, in which the wiper motor is switched off, if the wiper should be blocked outside its parking position and thus does not reach its parking position within a predetermined period of time, are known. In order to implement this anti-blocking protection, time-dependent controlling signals are needed, which are generated in the circuit. As known from experience, it is problematic to determine the period of time needed for controlling signals in this application because the period of time of a wiping cycle depends on influences of environment. Experiments made with wiper system, in which all time-dependent switching and controlling signals were derived from a timing signal with highly constant frequency have not always satisfactorily been successful.

Thus the object of the present invention is to provide a wiper system by using easiest means, which wiper system works in an optimal and safe manner during all modes of operation.

SUMMARY OF THE INVENTION

Thereby the invention is based on the idea that certain switching and controlling signals should be derived from a highly constant timing signal because, as far as the accuracy of the time taken by these signals is concerned, special requirements are made. The time taken by other switching and controlling signals, however, should be variable and depend, for instance, on the voltage. Thus, according to the present invention a timing signal with constant frequency or a timing signal with variable frequency within a certain area is produced as a function of the chosen mode of operation. From these timing signals time-dependent switching and controlling signals are derived. The change from constant to variable timing frequency could also depend on the operating state of the electric motor or on the control or switching state of the switching element via which the electric motor is controlled.

The basic idea of the present invention can be carried out in different ways. For instance, two timing oscillators could be assigned to the circuit, which is normally made in an integrated technique, the one timing oscillator of which releases a timing signal with constant frequency and the other timing oscillator of which releases a timing signal with variable frequency. In dependence of the chosen mode of operation, the timing signal of the one or the other oscillator could then be developed. Such a circuit, however, is not easily made because two oscillators with the time-determining components are needed. Thereby it is of a disadvantage that apart from requiring more space, two time-determining devices are necessary on the chip of the integrated circuit, which device cannot readily be integrated and which therefore have to be soldered on a printed circuit board as additional components.

Therefore an alternative is preferred in which only one oscillator is integrated into the circuit, the timing frequency of which can be varied by an input valve. In the easiest case this is a so-called oscillator controlled by voltage, to which oscillator a constant voltage is conducted in the one case, and to which a variable voltage depending on the battery voltage of the motor vehicle is conducted in the other case. As to such a solution only little space is needed on the chip for generating the changeable timing frequency of the timing signal, and it is sufficient to have one time-determining device that cannot be integrated into the circuit at least in case of timing signals of low frequency.

BRIEF DESCRIPTION OF THE DRAWING

The invent now be described in the following detailed description when taken in conjunction with the accompanying drawing in which the single figure illustrates a wiper system for motor vehicles in accordance with the principles of the present invention.

DETAILED DESCRIPTION

In the drawing the battery is designated by 10, the ignition switch by 11 and an operating switch by 12 for a wiper system, the windshield wiper of which can be driven by an electric motor 13. This electric motor 13 is supplied, as it is usually known, from the battery 10 of the motor vehicle via contacts 14, 15 of two switching elements 16 and 17. The switching elements 16, 17 are realized by relays in the present case, however, transistors could also be used. The mode of operation of the wiper system can be influenced via the switching element 17, for as it is known, high wiping speed can be changed into low wiping speed. The operating circuit of the motor 13 is switched via the other switching element 16. The electric motor 13, as it is also usually known, comprises an end position switch 18 which in the parking position of the windshield wiper conducts ground potential, outside the parking position, however, conducts positive potential to the circuit designated by 20. Furthermore switching signals of the operating switch 12 are transmitted to this circuit 20, which operating switch in the present embodiment can be switched over from the rest position illustrated into a first switching position for continuous operation, then into a switching position for intermittent operation and finally into a switching position for wash-wipe-operation. This circuit 20 evaluates these signals of the operating switch and produces time-dependent switching signals for controlling the switching elements 16 and 17. The features described up to now are part of the prior art.

As to the present invention the pulse frequency, from which the time-dependent switching signals are derived, is variable or switchable. For this purpose an oscillator 30 controlled by voltage and comprising the frequency-determining capacity 31 is integrated into the circuit 20. This oscillator has a control input 32 and the voltage of this input 32 determines the frequency of the timing signal of this oscillator that can be picked up at the output 38, from which the time-dependent switching and/or controlling signals are derived in the known way so that no further explanations are needed. This control input 32 of the oscillator is connected with the positive pole of the circuit via a diode 33 and a resistor 34. A Zener diode 36 is connected with the joint connecting point 35 of the diode 33 and of the resistor 34, the other conjunction of the Zener diode is connected to ground potential via the collector-emitter-path of a transistor 37. Thereby the transistor 37 serves as a switch determining whether there is constant or variable voltage at the input 32 of the oscillator 30. If the transistor 37 is nonconductive, via the resistor 34 and the diode 33 at the input 32 of the oscillator 30 there is battery voltage at the input 32, which battery voltage can vary between 9 and 18 Volt in a motor vehicle. If the transistor 37, however, is conductive, the voltage at the input 32 of the oscillator is essentially determined by the Zener voltage and is kept to a constant, stabilized value.

The transistor 37 is controlled via a control logic comprising an OR-Gate 40, an inverter 41 as well as a bi-stable toggle stage. The set input 43 of the bi-stable toggle stage is controlled via the operating switch 12, when the wipe-wash operation is switched on. A switching signal is transmitted from the output of the witching element 16 to the reset input 44 of the toggle stage 42 via the conductor 45. Thus this conductor 45 is connected to positive potential, if the motor 13 is connected to voltage, but it is connected to ground potential, if the motor is not on. This signal on the conductor 45 is also transmitted to the inverter 41.

This circuit functions as follows: While the operating switch 12 is switched off, the electric motor 13 is short-circuited via the contacts 14, 15 of the two switching elements 16, 17 and is stopped in its parking position, win which the end position switch 18 occupies the position illustrated. While the ignition switch 11 is switched on, the oscillator 30 produces a constant timing frequency because the ground potential on the conductor 45 is inverted via the inverter 41 and thus the transistor 37 is switched on via the OR-Gate 40 so that there is constant voltage at the input 32 of the oscillator. When the operating switch 12 is changed into it s first switching position, the circuit 20 releases a switching signal for controlling the switching element 16 and thus the electrical motor 13 is connected to the battery 10. Thus positive potential can be measured on the conductor 45 and consequently the transistor 37 is nonconductive. At the input 32 of the oscillator 30 there is battery voltage then. A time-dependent control signal is derived from the output signal of the oscillator. The time taken by said time-dependent control signal is to be little longer than the time taken by a wiping cycle. This reference time span is to start always then, when the motor of the wiper is to leave its parking position, what can be realized by a switching signal of the end position switch 18 of by a control signal for the motor of the wiper. If no further switching signal of the end position switch 18 can be measured, it can be assumed that the wiper is blocked. Then the circuit 20 is to release a switching signal in such a way that the switching element 16 is switched off and the electric motor 13 is cut off from the voltage source. Thus the motor is well protected from overheating in case of its blocking. Since the timing frequency of the oscillator 32 depends on the battery voltage, the reference time span also depends on the battery voltage. This dependence is chosen in such a way that in case of lower battery voltage the reference time span is lengthened to the same extent as the period of time for a wiping cycle is increased in case of diminishing battery voltage for the electric motor. Therefore, it can be ensured that the reference time span is, so to speak, continuously adapted to the wiping time changing in dependence of the battery voltage. Thus it is ensured that in case of failure the electric motor is switched off in time.

In the following it is assumed that the operating switch 12 is brought into its second switching position in which intermittent operation is switched on. For this purpose first of all the switching element 16 is controlled so that the motor 13 is connected to voltage. After a wiping cycle the switching element 16 is switched off again in the known way, via a signal of the end position switch 18 and via the circuit 20 so that the electric motor 13 is stopped. Then the circuit 20 generates a time-dependent switching signal determining the length of the interval between two wiping processes and only when the interval is over, the switching element 16 is switched on again.

The circuit ensures that during the wiping the conductor 45 is connected to positive potential and that thus the transistor 37 is nonconductive, whereas during the interval between two wiping processes the conductor 45 is connected to ground potential and thus the transistor 37 is switched on.

From the above it can be concluded that, if the motor is running, while the transistor 37 is nonconductive, at the input 32 of the oscillator 30 there is a variable input value depending on the battery voltage, whereas if the motor is stopped, that means during the interval between two wiping cycles, while the transistor 37 is switched on, constant voltage as an input value is conducted to the oscillator. Thus while the motor is running, the frequency of the timing signal of the oscillator 30 depends on the battery voltage so that anti-blocking protection is guaranteed best. However, during the interval the frequency of the switching signal of the oscillator 30 is constant so that independently of voltage variations the length of the interval can be implemented with great precision, as it was desired.

On the whole it can be stated that as to the embodiment illustrated in the drawing, the frequency of the timing signal of the oscillator is variable during continuous operation and that it depends on the battery voltage. During another mode of operation however, namely during intermittent operation, the frequency of the control signal is variable at times, namely then, when the motor is connected to voltage, but it is constant during the interval because in case of the electric motor 13 being short-circuited the transistor 37 is switched on. Thus, the frequency of the timing signal depends on the one hand on the mode of operation predetermined by the operating switch, and on the other hand on the switching state of the electric motor or of the switching element 16 controlling this electric motor. Thereby it must be kept in mind that as to the modes of operation "continuous operation" and "intermittent operation" a variable timing frequency is provided for the time the motor is running, in order to implement in an optimal manner anti-blocking protection, and that only during intermittent operation, while the electric motor is switched off a fixed timing frequency is predetermined in order to ensure the precision required with respect to the interval.

During wipe-wash-operation, however, this principle is no longer maintained, and also while the electric motor is running, a constant frequency of the timing signal is desired so that during this mode of operation the time-dependent controlling signals necessary for the washing operation, wipe-after-wash operation, etc., can be obtained in the accurate way as required Thus a certain inaccuracy with respect to the function of antiblocking protection is deliberately accepted thereby During the wipe-wash-operation the bi-stable toggle stage 42 is set via the operating switch 12 and thus the transistor 37 is switched on so that regardless of the motor operation there is constant voltage at the input 32 of the oscillator 30. This switching state is kept at first, when the operating switch is set back into its rest position. The circuit 20 goes on releasing controlling signals for controlling the switching element 16 and/or a switching element 50 for controlling a washing pump 51. Normally the wipe-wash-operation works in such a way that the washing pump is running during the time the operating switch 12 is switched on, after the operating switch is switched off, however, the motor of the wiper 13 keeps being switched on for a certain time, whereas the motor of the washing pump 51 is switched off immediately. During this so-called wipe-after-wash period of time, which should be as independent as possible of any conditions of environment, the conductor 45 is connected to positive potential so that the mono-stable toggle stage 42 keeps its switching state. After the wipe-and-wash period of time, however, the toggle stage 42 is reset by means of the negative switching slope on the conductor 45. Thus during wipe-wash-operation the frequency of the timing signal of the oscillator is also constant during that time during which the motor the wiper is connected to operation voltage. During continuous operation or during intermittent operation, however, the timing frequency of the oscillator 30 is variable during the time of operation.

Finally, it is pointed out that the circuit diagram illustrates the basic idea only schematically and of course, it comprises a circuit capable of further components, as for instance components for interference suppression. As to the disclosed circuit the operating switch also may include further switching positions, as for instance for changing the wiping speed and for determining defined times of the interval. Regarding the circuit illustrated in the drawing, the control conductor connected to a conductor conducting the operating current could lead to interference. Therefore a circuit configuration, in which this control conductor 45 is connected to the control input of the switching element 16 and thus in which the switching over does not depend on the switching state of this switching element, but rather on the control state, also is possible. A circuit, in which this control conductor picks up a signal at the end position switch, also is possible because the motor can be inside or outside the parking position. From this, a corresponding switching signal for changing from constant to variable timing frequency can be derived.

As to the present invention the timing frequency is variable in dependence of the battery voltage. Of course embodiments are also possible, in which other input values, as for instance the quantity of the motor current, as an alternative or additionally can be taken into consideration.

What is claimed is:

1. A wiper circuit system for driving a windshield wiper of an automotive vehicle having a vehicle battery, said system comprising, in combination:
   an electric motor adapted to be mechanically coupled to a windshield wiper and being controlled by an operating switch for different modes of operation;
   an oscillator circuit having an input coupled to said operating switch and having an output for applying variable frequency operating potential control signals to said motor;
   means responsive to the voltage of said vehicle battery for varying the frequency of said oscillator circuit as a function of the vehicle battery voltage when said operating switch selects a continuous operation mode of operation of said motor; and
   means for maintaining the frequency of said oscillator circuit to a constant value when said operating switch selects an intermittent operation mode of operation of said motor.

2. The system according to claim 1, including an electrical relay for applying said operating potential control signals to said motor, said relay having an input coil coupled to said operating switch and having an output coupled to said oscillator circuit for controlling the frequency of said oscillator circuit.

3. The system according to claim 1, wherein said operating switch is switchable from a rest position into a first switching position for continuous operation, into a second switching position for intermittent operation and into a third switching position for wash-wipe operation.

4. The system according to claim 3, wherein during said wash-wipe operation said frequency of said oscillator circuit is maintained to a constant value independent of said vehicle battery voltage.

* * * * *